(12) United States Patent
Fisher et al.

(10) Patent No.: US 8,551,411 B2
(45) Date of Patent: Oct. 8, 2013

(54) EXHAUST SYSTEM FOR LEAN-BURN INTERNAL COMBUSTION ENGINE COMPRISING PD-AU-ALLOY CATALYST

(75) Inventors: Janet Mary Fisher, Reading (GB); John Benjamin Goodwin, Royston (GB); Peter Christopher Hinde, Chalgrove (GB); Sylvie Cécile Laroze, Pepinster (BE); Agnes Suganya Raj, Reading (GB); Raj Rao Rajaram, Slough (GB); Emma Ruth Schofield, Reading (GB)

(73) Assignee: Johnson Matthey Public Limited Company, London (GB)

( * ) Notice: Subject to any disclaimer, the term of this patent is extended or adjusted under 35 U.S.C. 154(b) by 132 days.

(21) Appl. No.: 12/991,741

(22) PCT Filed: May 8, 2009

(86) PCT No.: PCT/GB2009/050485
§ 371 (c)(1),
(2), (4) Date: Apr. 4, 2011

(87) PCT Pub. No.: WO2009/136206
PCT Pub. Date: Nov. 12, 2009

(65) Prior Publication Data
US 2011/0173959 A1  Jul. 21, 2011

(30) Foreign Application Priority Data

May 9, 2008 (GB) .................................. 0808427.9
May 21, 2008 (GB) .................................. 0809233.0

(51) Int. Cl.
*B01D 50/00* (2006.01)

(52) U.S. Cl.
USPC ............................................ 422/177; 422/180

(58) Field of Classification Search
USPC .............. 422/177, 180; 60/274, 286; 502/325
See application file for complete search history.

(56) References Cited

U.S. PATENT DOCUMENTS

| | | | |
|---|---|---|---|
| 4,048,096 A | 9/1977 | Bissot | |
| 5,897,846 A | 4/1999 | Kharas et al. | |
| 6,127,300 A | 10/2000 | Kharas et al. | |
| 6,174,835 B1 * | 1/2001 | Naito et al. | 502/325 |
| 6,763,309 B2 | 7/2004 | Kieken et al. | |
| 7,063,642 B1 | 6/2006 | Hu et al. | |
| 7,709,407 B1 | 5/2010 | Hao | |
| 7,745,367 B2 | 6/2010 | Fujdala et al. | |

(Continued)

FOREIGN PATENT DOCUMENTS

| | | |
|---|---|---|
| CN | 1391984 | 1/2003 |
| CN | 1692215 | 11/2005 |

(Continued)

OTHER PUBLICATIONS

International Search Report dated Aug. 25, 2009.

(Continued)

*Primary Examiner* — Tom Duong
(74) *Attorney, Agent, or Firm* — RatnerPrestia (57) ABSTRACT

An apparatus (10) comprising a lean burn internal combustion engine (12) and an exhaust system (14) comprising at least one catalytic aftertreatment component (18, 20, 22), wherein the at least one catalytic aftertreatment component comprises a catalyst composition comprising an alloy consisting of palladium and gold on a metal oxide support.

11 Claims, 4 Drawing Sheets

(56) References Cited

U.S. PATENT DOCUMENTS

| | | |
|---|---|---|
| 2003/0013904 A1 | 1/2003 | Chaturvedi et al. |
| 2005/0095189 A1 | 5/2005 | Brey |
| 2005/0172941 A1 | 8/2005 | Torgov et al. |
| 2007/0134144 A1 | 6/2007 | Fajardie et al. |
| 2008/0053071 A1* | 3/2008 | Adams et al. ............ 60/286 |
| 2008/0124514 A1 | 5/2008 | Fujdala et al. |
| 2008/0125308 A1 | 5/2008 | Fujdala et al. |
| 2008/0125309 A1 | 5/2008 | Fujdala et al. |
| 2008/0125313 A1 | 5/2008 | Fujdala et al. |
| 2008/0227627 A1 | 9/2008 | Strehlau et al. |
| 2008/0242535 A1* | 10/2008 | Liu et al. .................. 502/232 |

FOREIGN PATENT DOCUMENTS

| | | |
|---|---|---|
| CN | 1921936 | 2/2007 |
| CN | 101061294 | 10/2007 |
| DE | 19538799 | 4/1997 |
| DE | 112009000423 | 12/2010 |
| EP | 0341832 | 11/1989 |
| EP | 0449423 A1 | 10/1991 |
| EP | 0499402 | 8/1992 |
| EP | 602865 | 6/1994 |
| EP | 707883 A2 | 4/1996 |
| EP | 0904835 A2 | 3/1999 |
| EP | 1057519 | 12/2000 |
| EP | 1175939 A1 | 1/2002 |
| EP | 1570895 A2 | 9/2005 |
| EP | 1721665 | 11/2006 |
| EP | 1925362 | 5/2008 |
| FR | 2771310 A1 | 5/1999 |
| FR | 2886248 | 12/2006 |
| GB | 2444125 | 5/2008 |
| GB | 2444126 A | 5/2008 |
| JP | 10-216518 | 8/1998 |
| JP | 2002-273239 | 9/2002 |
| JP | 3903598 | 4/2007 |
| WO | 9700119 A1 | 1/1997 |
| WO | 0180978 | 11/2001 |
| WO | 0226379 A1 | 4/2002 |
| WO | 2004025096 | 3/2004 |
| WO | 2005030382 A2 | 4/2005 |
| WO | 2006045606 | 5/2006 |
| WO | 2006056811 A1 | 6/2006 |
| WO | 2006120013 A1 | 11/2006 |
| WO | 2007042888 A1 | 4/2007 |
| WO | 2008011146 | 1/2008 |
| WO | 2008012572 A2 | 1/2008 |
| WO | 2008064152 A2 | 5/2008 |
| WO | 2008/088649 | 7/2008 |
| WO | 2008088649 A1 | 7/2008 |
| WO | 2008117941 A1 | 10/2008 |
| WO | 2009106849 A2 | 9/2009 |
| WO | 2009136206 A1 | 11/2009 |
| WO | 2010090841 A2 | 8/2010 |

OTHER PUBLICATIONS

Beck, A. et al., "Genesis of Au-Pd Nanoparticles Supported on SiO2: Structure and Catalytic Activity in CO Oxidation," N. American Cat. Soc., Jun. 2, 2003.

Chinese Search Report dated Dec. 3, 2012 from corresponding Chinese Application No. 200980116763.X, filed May 8, 2009.

* cited by examiner

EXHAUST SYSTEM FOR LEAN-BURN INTERNAL COMBUSTION ENGINE COMPRISING PD-AU-ALLOY CATALYST

CROSS-REFERENCE TO RELATED APPLICATIONS

This application is the U.S. National Phase application of PCT International Application No. PCT/GB2009/050485, filed May 8, 2009, and claims priority of British Patent No. 0808427.9, filed May 9, 2008, and British Patent Application No. 0809233.0, filed May 21, 2008, the disclosures of all of which are incorporated herein by reference in their entirety for all purposes.

FIELD OF THE INVENTION

The present invention relates to an apparatus comprising a lean burn internal combustion engine, such as a compression ignition (diesel) or a lean burn gasoline engine, and an exhaust system comprising one or more catalytic aftertreatment components. Such apparatus may be used in a mobile application, such as a vehicle, or a stationary application, such as a power generation unit.

BACKGROUND OF THE INVENTION

It is known to treat exhaust gases from a lean burn internal combustion engine with a catalytic aftertreatment component comprising both platinum (Pt) and palladium (Pd). See for example WO 2004/025096.

It has been suggested to oxidise carbon monoxide (CO) in exhaust gas from stoichiometric exhaust gas—as opposed to lean-burn exhaust gas—to carbon dioxide ($CO_2$) using a catalyst that comprises co-precipitated noble metal particles and metal oxide particles, such as $Au/CeO_2$ (see EP 602865).

Furthermore, it has been suggested to catalytically convert CO emitted from a smoking device such as a cigarette to $CO_2$ using a layered metal oxide catalyst comprising a plurality of metal oxide layers, wherein an outer layer may comprise one or more noble metals such as gold, silver, platinum, palladium, rhodium, ruthenium, osmium or iridium or a mixture thereof (see EP 0499402).

U.S. Pat. No. 4,048,096 discloses the use of palladium-gold alloys deposited on a catalyst support for the preparation of vinyl esters.

GB2444125A discloses an engine exhaust catalyst comprising a first supported catalyst and a second supported catalyst. The first supported catalyst may be a platinum catalyst, a platinum-palladium catalyst or a platinum catalyst promoted with bismuth. The second supported catalyst comprises palladium and gold species. The first and second supported catalysts are coated onto different layers, zones or substrate monoliths. In one arrangement an inner layer comprising the second supported catalyst is separated from an outer layer comprising the first supported catalyst by a buffer layer. The document does not mention Pd—Au alloys. Furthermore, it explains that the formation of less active Pt—Pd—Au ternary alloys should be avoided, hence the use of the buffer layer to separate the Pt from the Pd—Au.

WO 2008/088649 discloses an emission control catalyst comprising a supported platinum-based catalyst, and a supported palladium-gold catalyst. The two catalysts are coated onto different layers, zones or substrate monoliths such that the Pt-based catalyst encounters the exhaust stream before the palladium-gold catalyst. Similarly to GB2444125A, the document does not mention Pd—Au alloys, but explains that ternary Pt—Pd—Au alloys should be avoided.

There exist a number of difficulties in treating lean-burn exhaust gas to meet existing and future emission standards throughout the world, including Euro IV, V and VI in an efficacious and cost-effective manner. In the latter regard, it will be appreciated that the cost of platinum is presently over US$2000 per troy ounce. A number of particular difficulties include meeting emission standards for "tailpipe" hydrocarbons by oxidising unburned hydrocarbon fuel to $CO_2$ and water; and that whilst there have been moves throughout the world to reduce the quantity of sulphur present in fuel (ultra low sulphur diesel (ULSD) available in US contains a maximum of 15 ppm sulphur and diesel containing 50 ppm sulphur is currently mandated in Europe, falling to 10 ppm from January 2009), sulphur poisoning of aftertreatment catalysts remains an issue, particularly as on-board diagnostics-based legislation is introduced.

Whilst use of palladium in combination with platinum has reduced the cost of catalytic aftertreatment components, the use of palladium in diesel oxidation catalysts is somewhat limited due to its relatively lower reactivity under very oxidising (lean) conditions relative to platinum. Unlike platinum, which has a higher ionisation potential and lower oxide stability, palladium exists mostly as an oxide with low specific activity for the oxidation of CO and hydrocarbons (alkene and long chain alkane). Furthermore, where passive regeneration of filters by combusting trapped particulate matter in nitrogen dioxide from oxidizing nitrogen monoxide present in exhaust gas is desired (according to the process disclosed in EP 0341832), palladium has a lower specific activity for NO oxidation under the high $O_2$ concentration condition typical of lean burn exhaust, e.g. diesel.

Palladium is also known for its ability to readily react with sulphur dioxide ($SO_2$) to form a stable sulphate. The decomposition of palladium sulphate in a lean environment requires temperatures in excess of 700° C., or lower temperatures (e.g. 500° C.) in rich exhaust gas but at a fuel penalty for creating the rich environment.

SUMMARY OF THE INVENTION

We have now devised a catalytic aftertreatment component suitable for treating exhaust gas from lean burn internal combustion engines, such as those for use in vehicles, which catalytic aftertreatment component has improved hydrocarbon and nitrogen oxide reactivity and sulphur tolerance relative to a palladium-only oxidation catalyst.

Accordingly, the invention provides an apparatus comprising a lean burn internal combustion engine and an exhaust system comprising one or more catalytic aftertreatment component, wherein one or more catalytic aftertreatment component comprises a catalyst composition comprising an alloy consisting of palladium and gold on a metal oxide support. It will be understood that unalloyed Au or Pd (as PdO) may also be present.

BRIEF DESCRIPTION OF THE DRAWINGS

In order that the invention may be more fully understood, reference is made to the accompanying drawings, wherein.

DETAILED DESCRIPTION OF THE INVENTION

Without wishing to be bound by any theory, we believe that alloying palladium with gold increases the metallic character and reactivity of the palladium. We have found that palladium reactivity, especially for the oxidation of $C_3H_6$, n-$C_8H_{18}$ and NO can be significantly improved by mixing it with Au.

The atomic ratio of Au:Pd in the catalyst composition can be from 9:1 to 1:9, such as from 5:1 to 1:5 or from 2:1 to 1:2. It will be appreciated from the accompanying Examples that it is expected that an atomic ratio of from 2:1 to 1:2, especially from 2:1 to 1:1, is more likely than the broader ratios to generate increased quantities of the preferred alloy of both Pd and Au. We also found that increasing Au improves NO oxidation activity of the Au—Pd.

In embodiments, the wt % of noble metal present in the catalyst composition is from 0.5 to 10.0, such as from 1.0 to 5.0.

It is recognised that the catalyst composition according to the broadest aspect of the present invention loses activity on exposure to sulphur dioxide in the feed gas, despite being readily regenerable at higher temperature. In an attempt to alleviate such issues, we have considered including platinum in the catalyst composition, in addition to palladium and gold, because Pt is relatively more sulphur tolerant than palladium, and because the presence of platinum in the catalyst composition may enable the catalyst as a whole to be sulphur regenerated more effectively at lower temperature. However, our preliminary results show (see Comparative Examples 1 and 2) that whilst a sulphated catalyst wherein Pt, Pd and Au are combined on the same metal oxide support (wherein the Pt—Pd—Au may or may not be present as a trimetallic alloy) and containing relatively high Pt content has a lower HC and CO oxidation light off temperature than a similar sulphated catalyst, wherein some of the Pt is replaced with Au, there does not appear to be any significant benefit to including Pt (relative to the activity of e.g. sulphated 2Pt:1Pd) vs. the cost of including the higher quantity of Pt in the Pt—Pd—Au/metal oxide support catalyst. Despite this, we believe that including Pt, optionally in combination with Pd such as up to 2Pt:1Pd (wt %), in arrangements such as those described hereinbelow, can reduce or inhibit sulphation of the associated Pd—Au alloy component. Moreover, by not combining Pt (and optional Pd) with the Pd—Au alloy component of the catalyst composition, we believe that the Pt can retain inter alia its renowned hydrocarbon and CO oxidation activity.

In this regard, according to one embodiment, the catalyst composition comprises platinum, wherein the platinum is located on a separate and distinct metal oxide support from the palladium and gold alloy. Preferably, the platinum is also combined with palladium to improve the sintering resistance of the platinum. In one embodiment, the gold and palladium alloy is on a first metal oxide support and the platinum (and optional palladium) is on a second metal oxide support and both are disposed in the same washcoat layer. In another embodiment, the platinum (and optional palladium) on a second metal oxide support is located in a zone of a substrate monolith upstream of a zone comprising the gold and palladium alloy on a first metal oxide support. In yet another embodiment, the platinum (and optional palladium) on a second metal oxide support is disposed in a layer under an overlayer comprising the palladium and gold alloy on a first metal oxide support.

The arrangement of Pt:Pd in an underlayer with the Pd:Au alloy in an overlayer is beneficial, particularly, though not exclusively, where a zeolite component is included in both layers, for at least two significant reasons. Firstly, we have found that this arrangement is surprisingly more active for hydrocarbon (HC) and carbon monoxide (CO) oxidation than the reverse arrangement, wherein the Pd:Au is in the underlayer (results not shown). This is surprising since it could have been expected that the better HC oxidation catalyst (Pt:Pd) located in the overlayer would have been more active for CO and HC oxidation overall, since the overlayer hinders diffusion of HC to the underlayer.

Although we do not wish to be bound by any theory, two possible reasons for this observation are: (i) oxidation of HC and CO in excess $O_2$ conditions by Pt or Pt:Pd catalysts is significantly inhibited by CO. Therefore, it is possible to enhance the performance of Pt or Pt:Pd catalysts by removing CO from the gas stream. Pd:Au alloy catalysts have relatively high activity in higher CO concentrations, so the Pd:Au alloy overlayer is more effective at removing CO from the gas stream prior to contacting the Pt-containing underlayer; and (ii) CO oxidation is an exothermic reaction and the energy generated on the overlayer promotes the HC oxidation on both the Au:Pd alloy and Pt-containing layers. The reverse arrangement, wherein the Pt-containing catalyst is in the overlayer, does not immediately benefit from the higher activity for CO oxidation of the Au:Pd alloy catalyst.

Secondly, the arrangement of Pd:Au alloy overlayer; Pt or PtPd underlayer requires less processing and so is less energy intensive to produce. For example, the Pt:Pd catalyst can be prepared by coating a washcoat including appropriate metal salts and metal oxide supports onto a substrate monolith, drying then calcining the coated part and then washcoating the Pt:Pd underlayer with a Pd:Au alloy washcoat overlayer, wherein the Pd:Au alloy has been pre-fixed onto an appropriate metal oxide support in the washcoat. The Pd:Au alloy is pre-fixed because of the chemistry of depositing the gold component onto the metal oxide support in the correct amounts, as is understood by the skilled person.

However, the reverse arrangement is more labour intensive, because the pre-fixed Pd:Au alloy components are first coated onto the support, but to prevent Pt salts from contacting the Pd:Au alloy catalyst, thereby reducing the HC oxidation activity of the catalyst overall, the Pt:Pd components must also be pre-fixed onto a metal oxide support in a separate step, i.e. a simple washcoating step using Pt and Pd metal salts in combination with a metal oxide cannot be used. So, the preferred arrangement is less energy intensive, because an additional calcination step to prefix the Pt:Pd components onto the metal oxide support is not required.

The substrate monolith can be a honeycomb flow-through monolith, either metallic or ceramic, or a filter. The filter can be full filter, e.g. a so-called wall-flow filter, or a partial filter such as is disclosed in EP1057519 or WO 01/080978.

Figure 1:
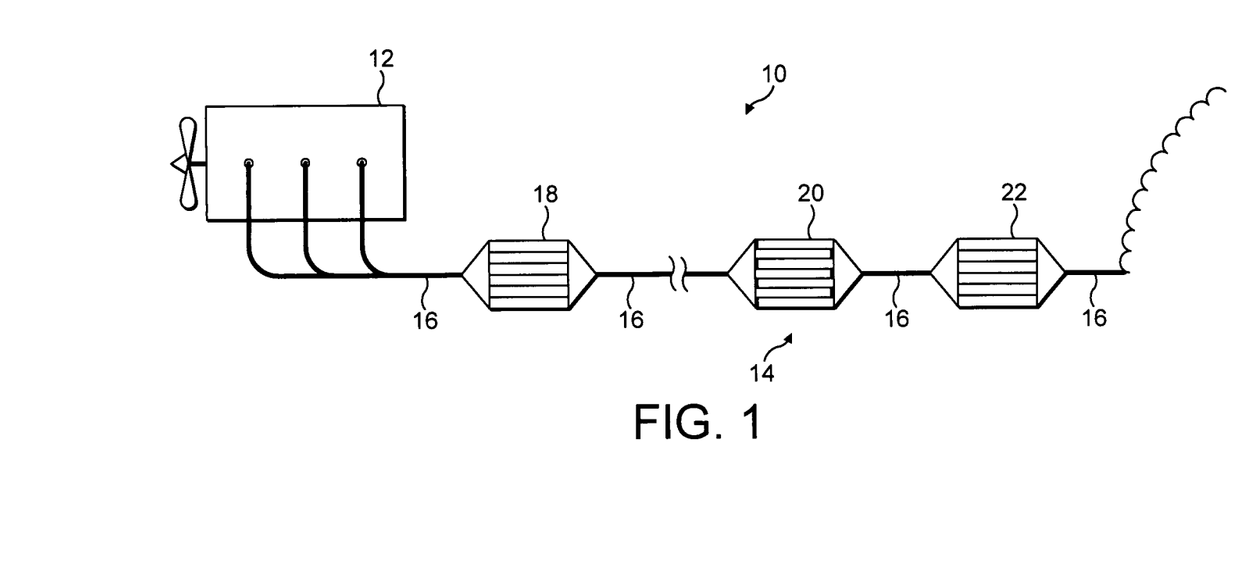
FIG. 1 shows a schematic drawing of an apparatus according to the invention for mobile vehicular use.

The catalytic aftertreatment component can be an oxidation catalyst, such as a diesel oxidation catalyst (DOC) or a lean $NO_x$ catalyst (with suitable hydrocarbon reductant provision means), or for apparatus requiring NO oxidation, a NOx absorber (comprising basic metals such as barium, caesium or potassium), a catalysed soot filter or an oxidation catalyst for use in a CRT®, as disclosed in FIG. 1 and described in EP0341832. For the purposes of this specification, a filter substrate monolith comprising an oxidation catalyst is known as a catalysed soot filer or CSF.

In the apparatus according to the invention, the lean burn internal combustion engine can be a compression ignition engine powered e.g. using diesel fuel, or a lean burn gasoline engine. The engine fuel can also include at least some: biodiesel, bio-ethanol, components derived from a gas-to-liquid (GTL) process, liquid petroleum gas (LPG) or natural gas (NG).

FIG. 1 shows an apparatus 10 according to the invention comprising a diesel engine 12 and an exhaust system 14 therefore. Exhaust system 14 comprises a conduit 16 linking catalytic aftertreatment components, namely a 2Au-0.5Pd/$Al_2O_3$ catalyst coated onto an inert metallic flowthrough substrate 18 disposed close to the exhaust manifold of the engine (the so-called close coupled position). Downstream of the close-coupled catalyst 18 in turn is a platinum group metal-catalysed ceramic wall-flow filter 20 and a further 2Au-0.5Pd/$Al_2O_3$ catalyst 22.

In use, the system benefits from the low temperature light off activity of the Au—Pd alloy catalyst located in a position where it may reach active temperature rapidly following keyon. Moreover, being located at a position where it is exposed to relatively high temperatures it is able to remain relatively sulphur-free, i.e. the relatively high temperatures at the engine manifold continuously promotes sulphur regeneration of the catalyst 18. Catalyst 18 promotes CO and hydrocarbon oxidation and also NO oxidation to $NO_2$, which $NO_2$ is available for passive oxidation of particulate matter trapped on the downstream catalysed filter 20. It will be appreciated that the process of combusting soot trapped on a filter of a diesel engine exhaust system in $NO_2$ is disclosed in EP 0341832.

The system is configured so that occasional forced regeneration of the filter is effected by injecting additional hydrocarbon fuel via one or more engine cylinder, which fuel is combusted on catalyst 18 and on the filter catalyst, the exotherm generated serving to combust any particulate matter on the filter and to return the filter to a substantially "clean" state. Hydrocarbon fuel introduced into the exhaust gas during a forced regeneration of the filter that "slips" the filter is oxidised on catalyst 22.

The following Examples are provided by way of illustration only.

EXAMPLES

Example 1

Preparation

A series of Pd—Au catalysts dispersed on $Al_2O_3$ at a nominal metal loading of 2.5 wt % and atomic composition of Pd:Au between 0:1 to 1:0 were characterised. The samples were prepared as follows: to an aqueous mixture of palladium nitrate and $HAuCl_4$ containing particulate alumina support was added a base to hydrolyse and deposit the gold as $Au_0$ onto the support. The slurry was filtered after an appropriate period, the filtrate was washed to remove chloride ions and the material dried then calcined. The catalysts prepared according to this technique are referred to herein as "fresh" catalysts.

Catalysts prepared by the above method are set out in Table 1.

TABLE 1

Catalysts

| Catalysts | Composition Wt % Au-Pd | Atomic Ratio Au:Pd |
|---|---|---|
| Au | 2.5-0 | 100:0 |
| Au-Pd | 2.0-0.5 | ~2:1 |
| Au-Pd | 1.7-0.8 | ~1:1 |
| Au-Pd | 1.25-1.25 | ~1:2 |
| Au-Pd | 1.0-1.5 | ~1:3 |
| Au-Pd | 0.5-2.0 | ~1:6 |
| Pd | 2.5 | 0:100 |

REFERENCE

A 1.7Pt-0.8Pd/$Al_2O_3$ catalyst prepared by impregnation of the support with a mixture of aqueous platinum and palladium salts, dried and calcined similarly to catalysts prepared according to Example 1 was used as a reference.

Example 2

Ageing

Fresh catalysts prepared according to the methods of Example 1 and the Reference Pt:Pd catalyst were aged for 48 hours in air at 650° C., 750° C. or 800° C.

Example 3

Lean Hydrothermal Ageing

Lean hydrothermal ageing (LHA) was done at 750° C. in 4.5% water/air balance for 48 hours.

Example 4

Testing Conditions

Catalysts were tested in synthetic catalyst activity test (SCAT) apparatus using the following inlet gas mixture: 1000 ppm CO, 900 ppm HC ($C_3H_6$ or n-$C_8H_{18}$ as C1), 200 ppm NO, 2 ppm $SO_2$, 12% $O_2$, 4.5% $CO_2$, 4.5% $H_2O$ and $N_2$ balance.

Example 5

Sulphur Ageing

Sulphur ageing of aged catalysts prepared according to Example 2 or 3 was done using the SCAT apparatus of Example 4 at 300° C. with 100-150 ppm $SO_2$ in gas stream from 15 to 400 mgS/g of catalyst (equivalent to 2-50 g/L) to a desired exposure level. The sulphur-aged catalyst was regenerated for 20 minutes at 500° C. in the full gas mixture described in Example 4.

Example 6

Catalyst Characterisation

Samples of aged catalysts obtained according to the method of Example 2 were characterised by X-ray diffraction (XRD), with the results set out in Table 2 below.

TABLE 2

XRD Samples

| Catalysts (Wt %) | Species present in XRD | | | XRD Alloy Au:Pd | | Assay Composition Au:Pd (at %) |
|---|---|---|---|---|---|---|
| | Au | Au-Pd Alloy | PdO | Crystallite size | Composition Au:Pd (at %) | |
| 2.5Au | Yes | — | — | 5 | | 100:0 |
| 2Au-0.5Pd | — | Yes | slight | 7 | 63:37 | 66:34 |
| 1.7Au-0.8Pd | — | Yes | slight | 6 | 58:42 | 50:50 |
| 1.25Au-1.25Pd | — | Yes | Yes | 6 | 58:42 | 34:66 |
| 1Au-1.5Pd | — | Yes | Yes | 8 | 80:20 | 25:75 |
| | | | | 9 | 52:48 | |

It can be seen from the results shown in Table 2 that complete alloying is achieved at a Pd:Au atomic ratio of 1:2 (2 wt % Au and 0.5 wt % Pd) and 1:1 (1.7 wt % Au and 0.8 wt % Pd). Increasing the Pd:Au atomic ratio above the 1:1 value induces the formation of a Au-rich alloy with free palladium oxide (PdO).

Characterisation of a Au/Pd particle of fresh 2Au-0.5Pd on the $Al_2O_3$ support prepared according to Example 2 by Transition Electron Microscope (TEM)-Energy Dispersive X-Ray spectroscopy (EDX) shows that across the particle the Au/Pd ratio remains constant, showing the alloy structure.

Figure 2:
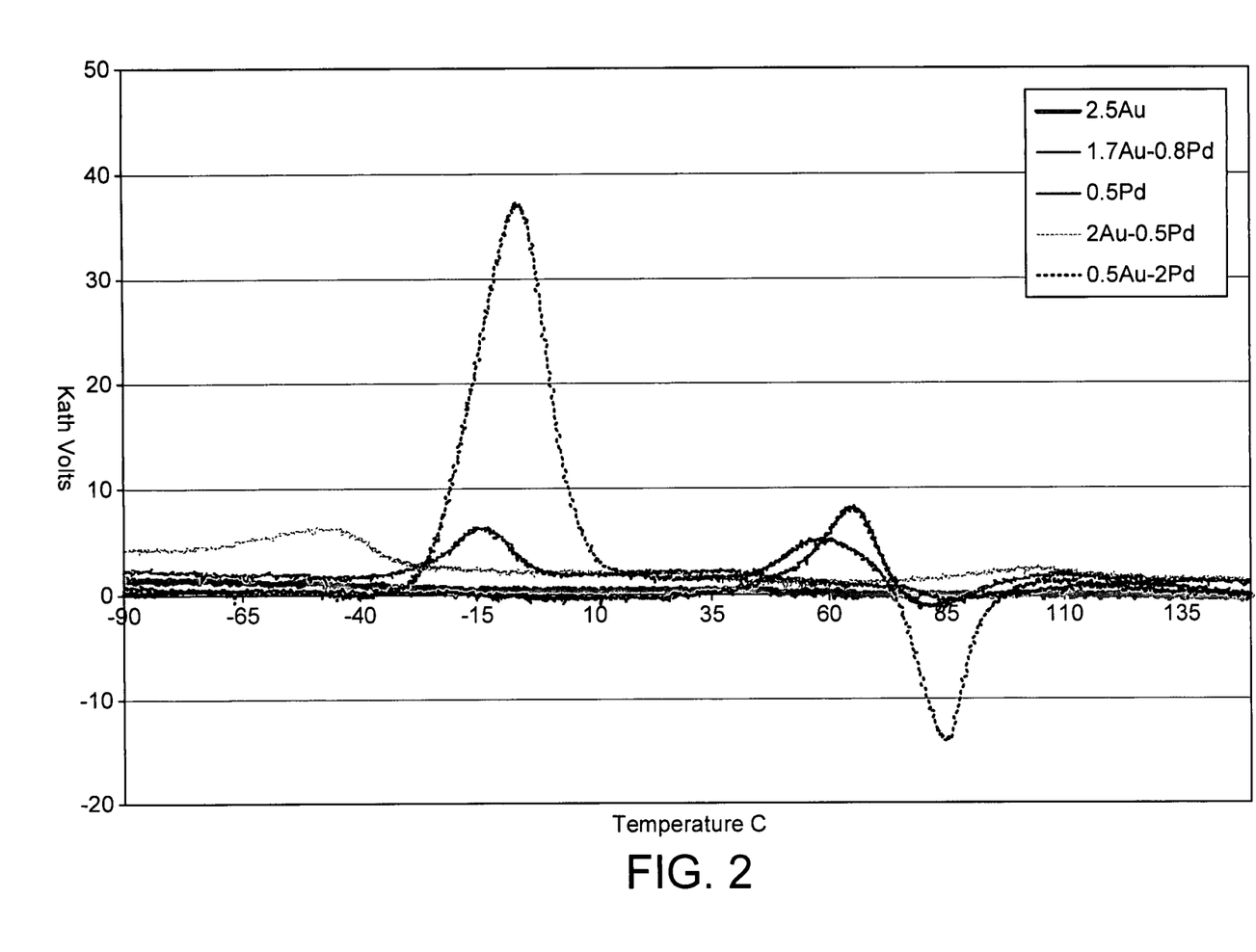
FIG. 2 is a graph showing results for $H_2$ temperature programmed reduction of aged catalysts according to the invention.

Temperature Programmed Reduction (TPR) analysis of an array of the catalysts prepared according to Example 1, the results of which are shown in FIG. 2, shows that decreasing Au:Pd ratio generates free PdO whereas Au promotes reducibility of PdO.

Example 7

Catalyst Testing

Table 3 sets out the results of activity tests carried out on the catalysts prepared according to Example 1, aged according to Example 2 at 750° C. (sulphur aged according to Example 6) and tested according to Example 4 (using $C_3H_6$ as hydrocarbon). It should be understood that T80 and T50 are the temperatures at which the catalyst oxidises CO or hydrocarbon (HC) at 80% or 50% conversion efficiency respectively.

TABLE 3

Pd=Au Catalysts

| Catalysts (Wt %) | Clean | | S-exposure 45 mgS/gCat | | Regeneration at 500° C. for 20 mins | |
|---|---|---|---|---|---|---|
|  | $CO_{T80}$ | $HC_{T50}$ | $CO_{T80}$ | $HC_{T50}$ | $CO_{T80}$ | $HC_{T50}$ |
| 2.5Au | 325 | 317 | | | | |
| 2Au-0.5Pd | 160 | 156 | 263 | 229 | 182 | 178 |
| 1.7Au-0.8Pd | 166 | 161 | 258 | 227 | 185 | 184 |
| 1.25Au-1.25Pd | 159 | 159 | 251 | 224 | 194 | 193 |
| 0.5Au-2Pd | 160 | 168 | 262 | 231 | 230 | 219 |
| 2.5Pd | 177 | 191 | 254 | 242 | 262 | 254 |

After thermal ageing at 750° C., the oxidation reactivities increases in the order of Pd—Au>Pd>> Au. The Au-only catalyst was significantly less active. Although the Pd and Pd—Au catalysts can be deactivated to a similar extent after sulphation, we found that the extent of recovery in activity after desulfation at 500° C. depends on the catalyst composition. It can also be seen that catalysts with a homogeneous alloy composition (2Au-0.5Pd and 1.7Au-0.8Pd) can be readily desulphated by a higher temperature exposure.

Example 8

Effect of Ageing Temperature

Table 4 sets out the results comparing the activity of fresh Pd only catalysts prepared according to Example 1 and aged 2Au-0.5Pd/$Al_2O_3$ catalysts prepared according to Example 2, 3 and 5. Testing was carried out according to Example 4 (using $C_3H_6$ as hydrocarbon).

TABLE 4

Effect of Ageing Temperature and Atmosphere (2Au-0.5Pd unless otherwise indicated).

| Catalysts | Clean | | S-exposure 45 mgS/gCat | | Regeneration at 500° C./20 min | |
|---|---|---|---|---|---|---|
|  | $CO_{T80}$ | $HC_{T50}$ | $CO_{T80}$ | $HC_{T50}$ | $CO_{T80}$ | $HC_{T50}$ |
| Pd only-500° C./2 hr | 178 | 188 | 269 | 242 | 250 | 243 |
| Calcined 500° C./2 hr | 145 | 153 | 261 | 224 | 205 | 211 |
| Calcined 650° C./48 hr | 154 | 153 | 266 | 232 | 184 | 185 |
| Calcined 750° C./48 hr | 162 | 156 | 263 | 229 | 182 | 178 |
| LHA 750° C./48 hr | 164 | 160 | 273 | 244 | 183 | 181 |
| Calcined 800° C./48 hr | 167 | 162 | 265 | 233 | 185 | 182 |

It will be appreciated that fresh catalyst aged according to Example 2 displays alloy character. It can be seen from the results in Table 4 that thermal ageing and ageing atmosphere does not significantly deactivate 2Au-0.5Pd and that desulphation characteristics are improved after thermal ageing compared to fresh catalyst.

Example 9

NO Oxidation and Alkane Oxidation Activities

Figure 3:
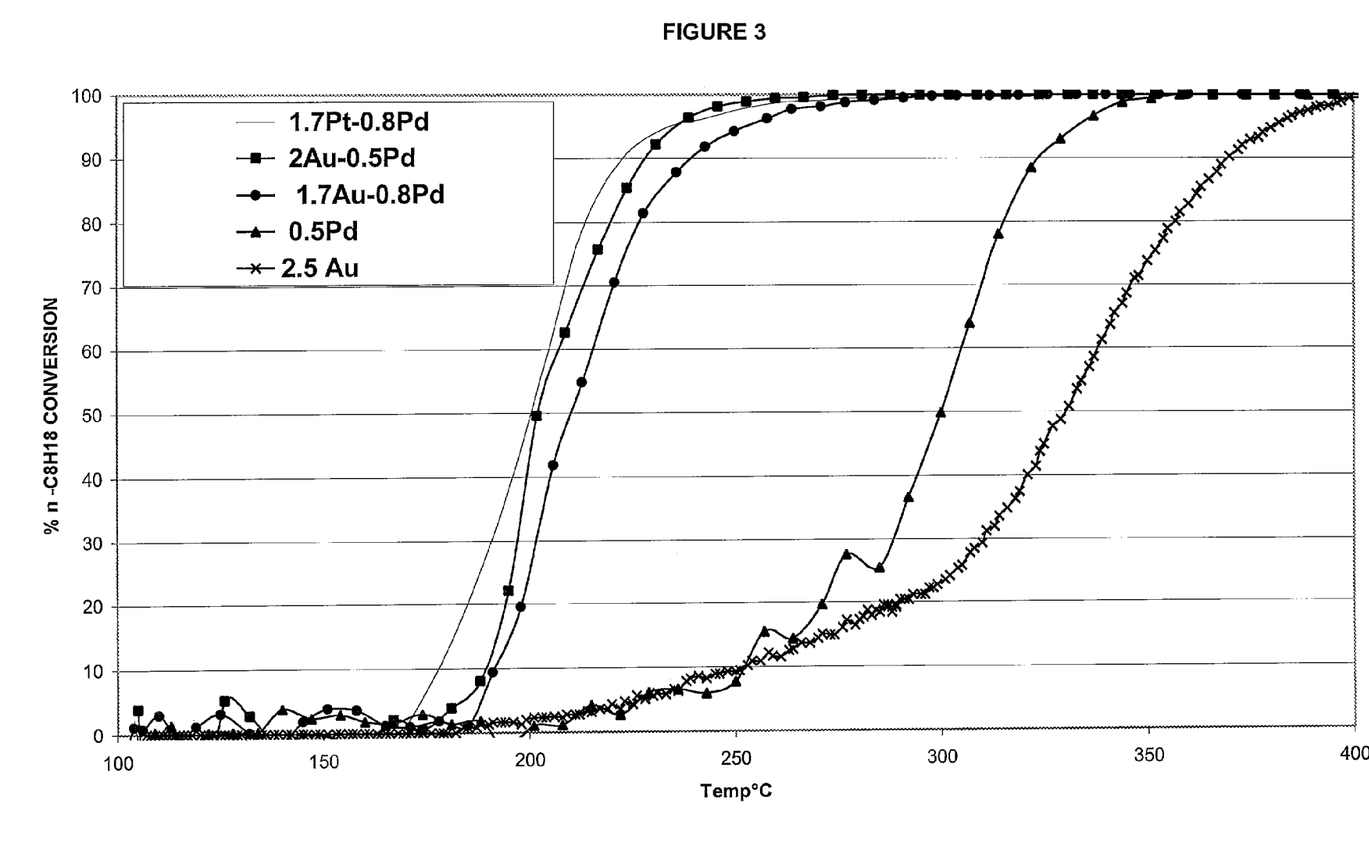
FIG. 3 is a graph plotting alkane (n-$C_8H_{18}$) conversion against temperature for a range of aged catalysts according to the invention and Pd-only, Au-only and 1.7Pt-0.8Pd/$Al_2O_3$ reference catalysts.
Figure 4:
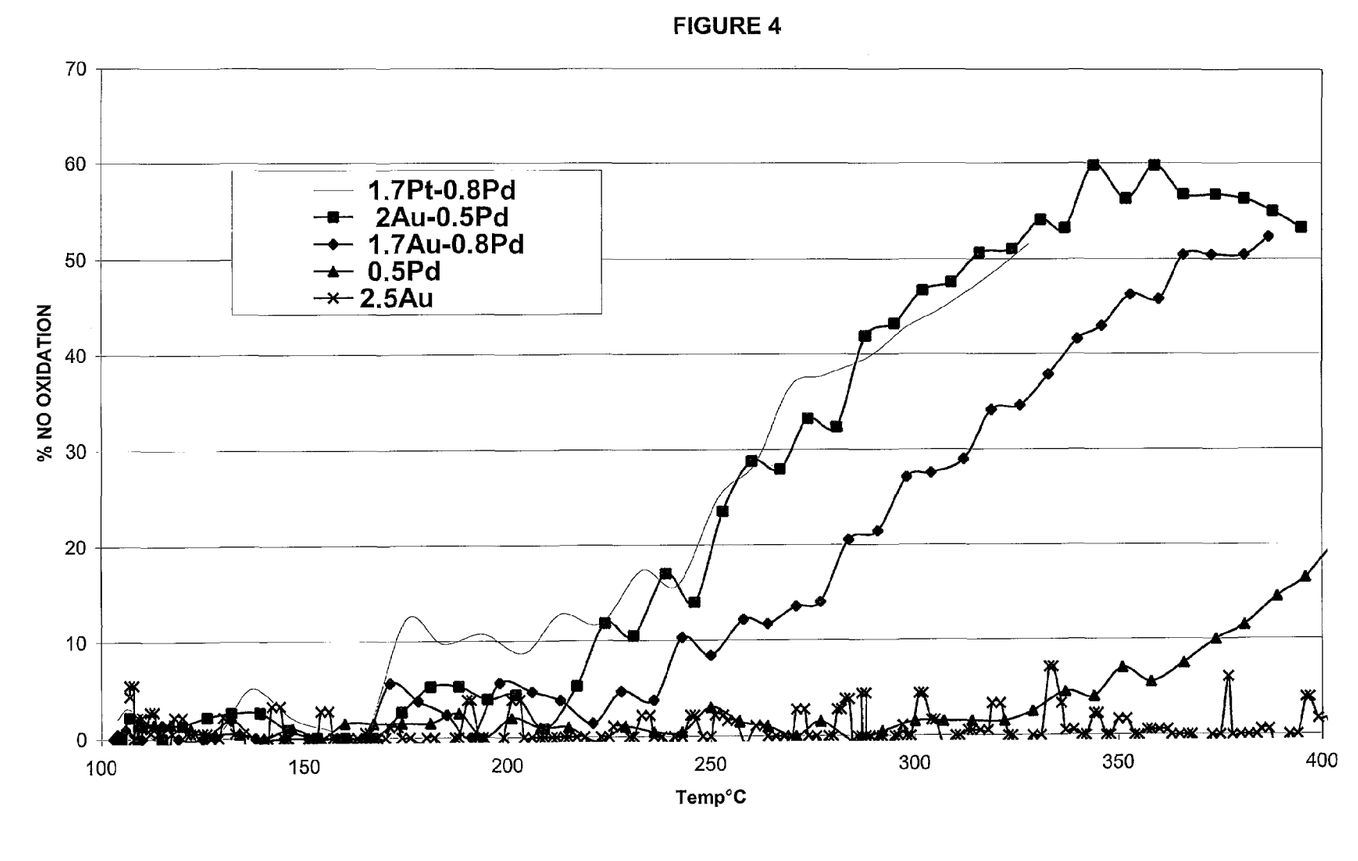
FIG. 4 is a graph plotting % NO oxidation against temperature for the catalysts shown in FIG. 3.

FIGS. 3 and 4 show the results of a test procedure according to Example 4 (using n-$C_8H_{18}$ as hydrocarbon) conducted on catalysts and reference catalysts prepared according to Example 1 and Reference and aged at 750° C. according to Example 2. From FIG. 3 it can be seen that the alkane conversion activity for 1.7Pt-0.8Pd, 2 Au-0.5 Pd and 1.7Au-0.8Pd catalysts are similar, whereas the Pd-only catalyst is significantly less active and the Au-only catalyst even less active.

FIG. 4 shows that the NO oxidation activity of 1.7Pt-0.8Pd and 2Au-0.5Pd are very similar, with 1.7Au-0.8Pd only marginally less active. Contrastingly, Pd-only and Au-only catalysts show virtually no NO oxidation activity.

Comparative Example 1

Preparation of Pt—Pd—Au Catalysts

A Pd—Au/$Al_2O_3$ sample prepared according to Example 1 was wet impregnated with a solution of platinum nitrate to achieve the desired Pt loading. The resulting material was then dried and calcined.

Comparative Example 2

Testing of Pt—Pd—Au Catalysts

Pt—Pd—Au/$Al_2O_3$ catalysts prepared according to Example 10 were aged at 750° C. according to Example 2 and tested according to Examples 4 and 5. The results are set out in Table 5, from which it can be seen that the activity of all of the clean catalysts is similar. However, following sulphur exposure the 0.5Pt-0.8Pd-1.2Au and 0.2Pt-0.8Pd-1.5Au samples show a very similar loss in activity, but the 0.9Pt-0.8Pd-0.8Au sample has an approximately 20° C. better $CO_{T80}$ value and an about 10° C. better $HC_{T50}$ value compared with either of the former two catalysts. Increased Au content improves sulphur-regenerated activity, but at decreased sulphur tolerance. It is not at present known whether any of the materials tested are alloys. However, while there appears to be a small advantage to adding Pt in higher amounts to Pd—Au, there does not appear to be any significant cost vs. benefit.

TABLE 5

| | Pt-Pd-Au catalysts | | | | | |
|---|---|---|---|---|---|---|
| | Clean | | S-exposure 45 mgS/gCat | | Regeneration at 500° C./20 min | |
| Catalysts (wt %) | $CO_{T80}$ | $HC_{T50}$ | $CO_{T80}$ | $HC_{T50}$ | $CO_{T80}$ | $HC_{T50}$ |
| 1.7Pt-0.8Pd-0Au | 170 | 166 | 198 | 211 | 179 | 180 |
| 0.9Pt-0.8Pd-0.8Au | 167 | 167 | 232 | 221 | 188 | 187 |
| 0.5Pt-0.8Pd-1.2Au | 166 | 166 | 253 | 231 | 186 | 184 |
| 0.2Pt-0.8Pd-1.5Au | 160 | 159 | 253 | 228 | 179 | 178 |
| 0Pt-0.8Pd-1.7Au | 166 | 161 | 258 | 227 | 185 | 184 |

In summary, collectively the results show that the catalysts with the Pd:Au atomic ratio of 1:1 and 1:2, where complete alloying has been formed show very different reaction characteristics to those with free PdO or Pd only or Au only catalyst. The catalyst has improved desulphation characteristics, and much higher alkane and NO oxidation activities to the Pd only catalyst. The formation of this homogeneous alloy is desirable to generate advantageous characteristics in a Pd—Au system. It can also be seen that Au—Pd systems exhibit similar activity to Pt—Pd systems at a fraction of the cost.

For the avoidance of any doubt, the entire contents of any and all prior art documents cited herein are incorporated herein by reference.

The invention claimed is:

1. An apparatus comprising a lean burn internal combustion engine and an exhaust system comprising at least one catalytic aftertreatment component, wherein the at least one catalytic aftertreatment component comprises a catalyst composition comprising an alloy consisting of palladium and gold on a metal oxide support, and platinum located on a separate and distinct metal oxide support from the palladium and gold alloy, wherein the platinum on the separate and distinct metal oxide support is disposed in a layer under an overlayer comprising the palladium and gold alloy on the metal oxide support.

2. An apparatus according to claim 1, wherein the atomic ratio of Au:Pd in the catalyst composition is from 9:1 to 1:9.

3. An apparatus according to claim 2, wherein the atomic ratio of Au:Pd in the catalyst composition is from 5:1 to 1:5.

4. An apparatus according to claim 3, wherein the atomic ratio of Au:Pd in the catalyst composition is from 2:1 to 1:2.

5. An apparatus according to claim 1, wherein the wt % of noble metal present in the catalyst composition is from 0.5 to 10.0.

6. An apparatus according to claim 5, wherein the wt % of noble metal present in the catalyst composition is from 1.0 to 5.0.

7. An apparatus according to claim 1, wherein the separate and distinct metal oxide support containing platinum also contains palladium.

8. An apparatus according to claim 7, wherein the platinum and palladium on the separate and distinct metal oxide support is disposed in a layer under an overlayer comprising the palladium and gold alloy on the metal oxide support.

9. An apparatus according to claim 1, wherein the at least one catalytic aftertreatment component comprises an oxidation catalyst, a lean $NO_x$ catalyst or a $NO_x$ absorber.

10. An apparatus according to claim 1, wherein the at least one catalytic aftertreatment component comprises a filter substrate monolith or a flow-through substrate monolith.

11. An apparatus according to claim 1, wherein the composition further comprises an alloyed Au and Pd as PdO.

* * * * *

UNITED STATES PATENT AND TRADEMARK OFFICE
CERTIFICATE OF CORRECTION

PATENT NO.       : 8,551,411 B2
APPLICATION NO. : 12/991741
DATED            : October 8, 2013
INVENTOR(S)      : Fisher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 279 days.

Signed and Sealed this
Fifteenth Day of September, 2015

Michelle K. Lee
*Director of the United States Patent and Trademark Office*